United States Patent
Havrda et al.

(10) Patent No.: US 6,804,689 B1
(45) Date of Patent: Oct. 12, 2004

(54) METHOD AND APPARATUS FOR AUTOMATICALLY SYNCHRONIZING DATA TO DESTINATION MEDIA

(75) Inventors: Robert D. Havrda, Austin, TX (US); Bryan P. Tacker, Austin, TX (US); Todd A. Berry, Austin, TX (US); Steven McBride, North Ogden, UT (US); Neil R. Shaw, Burnsville, MN (US)

(73) Assignee: Iomega Corporation, San Diego, CA (US)

( * ) Notice: Subject to any disclaimer, the term of this patent is extended or adjusted under 35 U.S.C. 154(b) by 0 days.

(21) Appl. No.: 09/533,456

(22) Filed: Mar. 23, 2000

Related U.S. Application Data

(60) Provisional application No. 60/129,258, filed on Apr. 14, 1999.

(51) Int. Cl.[7] .............................................. G06F 17/30
(52) U.S. Cl. ...................................... 707/204; 709/248
(58) Field of Search ........................... 707/204; 709/248

(56) References Cited

U.S. PATENT DOCUMENTS

| | | | | |
|---|---|---|---|---|
| 5,504,677 A | * | 4/1996 | Pollin | 705/45 |
| 5,649,200 A | * | 7/1997 | Leblang et al. | 707/203 |
| 5,896,445 A | * | 4/1999 | Kay et al. | 379/135 |
| 5,931,908 A | * | 8/1999 | Gerba et al. | 707/10 |
| H1830 H | * | 1/2000 | Petrimoulx et al. | 705/31 |
| 6,021,433 A | * | 2/2000 | Payne et al. | 340/7.29 |
| 6,061,334 A | * | 5/2000 | Berlovitch et al. | 370/255 |
| 6,108,697 A | * | 8/2000 | Raymond et al. | 709/218 |
| 6,151,608 A | * | 11/2000 | Abrams | 707/204 |
| 6,181,336 B1 | * | 1/2001 | Chiu et al. | 345/736 |
| 6,185,575 B1 | * | 2/2001 | Orcutt | 707/200 |
| 6,199,096 B1 | * | 3/2001 | Mirashrafi et al. | 709/202 |
| 6,247,128 B1 | * | 6/2001 | Fisher et al. | 713/100 |
| 6,253,300 B1 | * | 6/2001 | Lawrence et al. | 711/112 |
| 6,366,578 B1 | * | 4/2002 | Johnson | 370/353 |
| 6,434,619 B1 | * | 8/2002 | Lim et al. | 709/229 |

* cited by examiner

*Primary Examiner*—Wayne Amsbury
(74) *Attorney, Agent, or Firm*—James T. Hagler

(57) ABSTRACT

A data file mirroring application that monitors data files stored in a source directory for archiving on high capacity media. The mirroring application archives the data files to the high capacity removable media in accordance with user configured settings, and without user intervention. The data files may be archived based on a time period elapsing or a data file being revised and saved. The application may identify the high capacity media in accordance with a unique identifier of the high capacity media.

18 Claims, 10 Drawing Sheets

METHOD AND APPARATUS FOR AUTOMATICALLY SYNCHRONIZING DATA TO DESTINATION MEDIA

CROSS-REFERENCE TO RELATED APPLICATIONS

The present application is related to U.S. patent application Ser. No. 60/129,258, filed Apr. 14, 1999, entitled "Storing Revisions of Files on Removable Media Based on a Serial Number".

FIELD OF THE INVENTION

The present invention relates to system for archiving user files, and more particularly, to a system for automatically and periodically archiving user files to a selected destination media.

DESCRIPTION OF THE PRIOR ART

There are many types of potential disasters that may threaten a user's data. While most users envision disasters caused by flood or fire, more common scenarios are software glitches and hardware damage caused by physical or electric shock, or minor exposure to liquid. In the above cases, the hard disk itself may be undamaged, but the user may be unable to access data until the software is fixed and/or the damaged parts are replaced. If a user cannot wait for repair, it will be necessary to restore near-current data to another computer.

A key to a successful backup strategy is performing backups at a frequency such that important data is protected. Also, the backup media should be reliable and optimally sized to store the entire backup on a single piece of storage media. However, conventional backup utilities are difficult to use and have proprietary or incompatible formats. High capacity backup media, such as tape, requires a dedicated backup device and, often the destination machine does not have a compatible backup device. Further, a backup of data to conventional floppy media may require over a hundred floppy disks and consume hours of time.

Thus, there is a need for a system that simplifies the backup/archive process and provides adequate protection of important data. There is also a need for the backup to be made to high capacity media in a format that is compatible with a other computers. The present invention provides a such solution.

SUMMARY OF THE INVENTION

In view of the above, the present invention, through one or more of its various aspects and/or embodiments is thus presented to accomplish advantages over the prior art, such as those noted below.

In accordance with an aspect of the present invention, there is provided a system for archiving data files stored in a computer-readable format on a storage medium accessible by a computing device having a processor, memory and a high capacity media drive. The system includes a mirror application executed by the processor that resides in the memory of the computing device. The mirror application reads data files stored in a user-selected source directory on the storage medium in accordance with predetermined configuration setting and writes the data files to a high capacity media within the high capacity media drive.

In accordance with a feature of the invention, the predetermined configuration settings includes options to store revisions of files in the source directory, and to store files in the source directory to the high capacity media after a period of time elapses. Files may be stored to the high capacity storage media having a revision number appended to the file name thereof.

In accordance with another feature, a current status of the mirror application is provided via an animated icon that indicates at least one of a data copy operation, no high capacity media, monitoring the source directory, and if the mirror application is disabled.

In accordance with yet another feature, the high capacity media is identified by the mirroring application by a unique identifier. The unique identifier may comprise a serial number.

In accordance with another aspect of the invention, there is provided a method for archiving data files stored in a computer-readable format on a storage medium to a high capacity media drive. The method is executed in a computing device by a mirroring application, and includes monitoring data files in a source directory on the storage medium; reading the data files from the source directory in accordance with predetermined configuration settings; and writing the data files to a high capacity media within the high capacity media drive in accordance with the predetermined configuration settings. The predetermined user-defined configuration settings may include storing revisions of files in the source directory, and storing files in the source directory to the high capacity media after a period of time elapses.

In accordance with a feature of the invention, the act of writing the data files to the high capacity includes appending a revision to a file name of the data files. The method may also include identifying the high capacity media by a unique identifier. The unique identifier may be a serial number of the high capacity media.

In accordance with a further aspect of the invention, there is provided a computer-readable medium containing computer-executable instructions comprising a configuration module containing configuration settings, a reading module to read data files contained within a source directory on a selected storage medium in accordance with the configuration settings, and a writing module to write the data files to a destination high capacity media in accordance with the configuration settings.

In accordance with a feature of the invention, a high capacity media identifier module is provided that reads a unique identifier from the high capacity removable media to verify the identity of the high capacity removable media.

The foregoing and features and advantages of the invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings.

DETAILED DESCRIPTION OF THE PREFERRED EMBODIMENTS

The present invention is directed to an application for mirroring data files saved in a directory on a fixed or removable media drive to removable media for archival purposes and disaster recovery. The application runs in the background to periodically "mirror" user files to removable media and/or after the user files have been saved.

Figure 1:
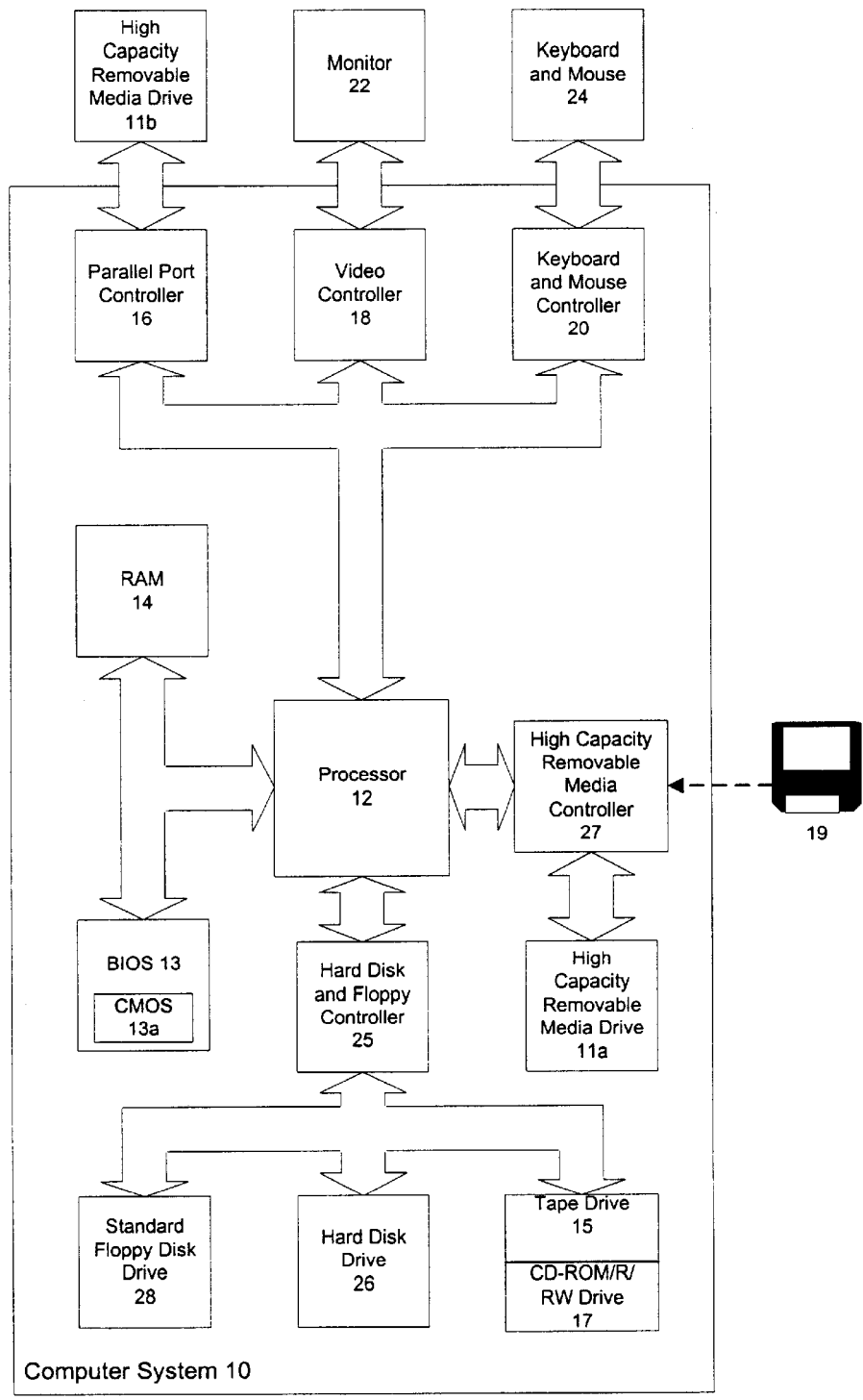
FIG. 1 is a block diagram of a computer system which includes a high capacity removable disk drive.
Figure 2:
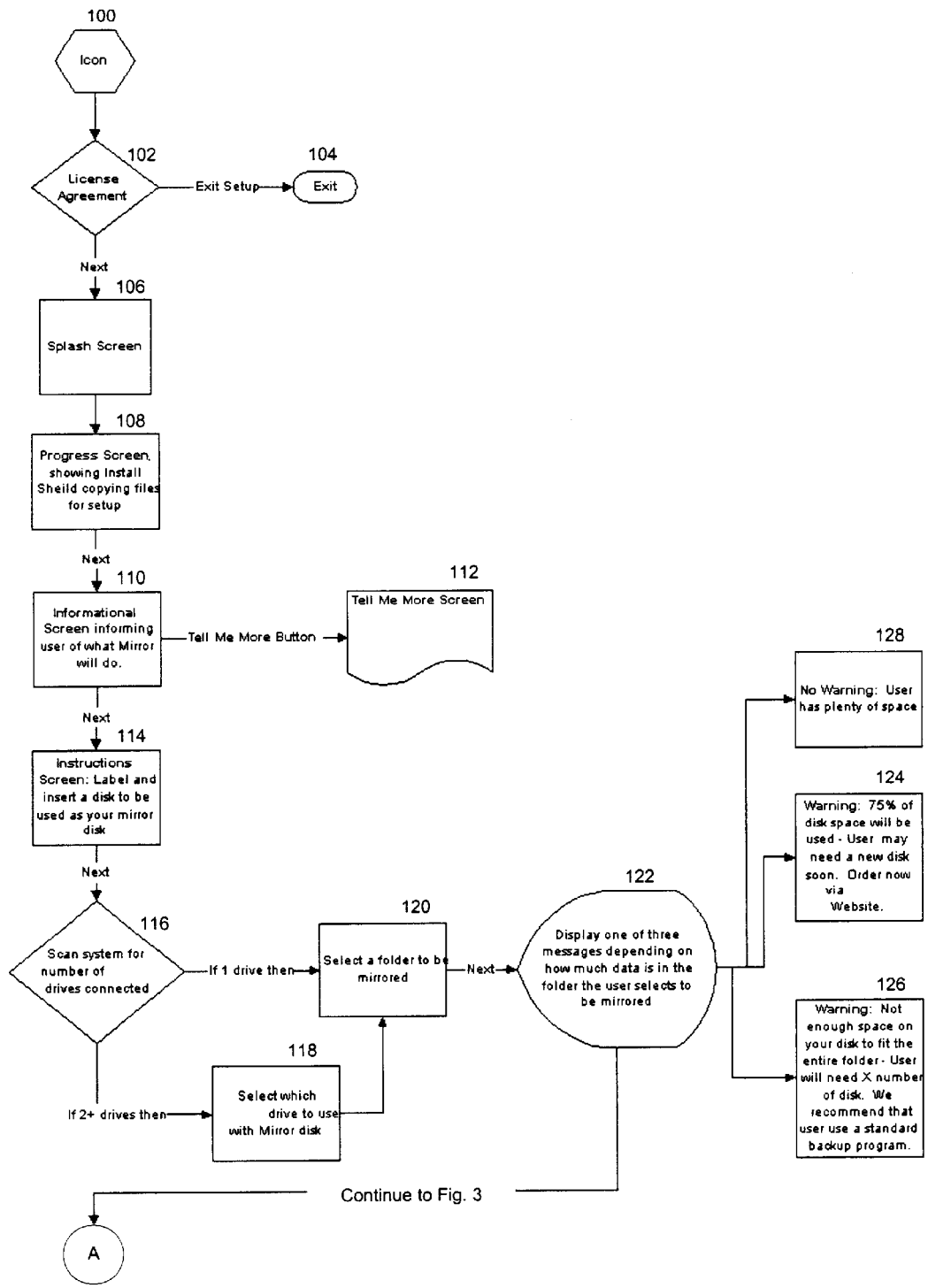
FIGS. 2–3 are a flow charts illustrating the processes performed by an installation application of the present invention.

Referring now to FIG. 1, there is illustrated a block diagram of an exemplary computer system 10. As shown, the computer system 10 is divided between internal and external components. The internal components include a Basic Input/Output System (BIOS) 13 and a processor (CPU) 12 that control the overall functioning of the computer system 10. A memory 14, a hard disk drive 26, a floppy disk drive 28, a tape drive 15, a CD-ROM/R/RW drive 17, and a high capacity removable media drive 11a are also connected to the CPU 12.

Typically, a conventional IBM-compatible computer system 10 employs the Windows 95 or Windows NT operating systems (available from Microsoft Corp., Redmond, Wash.) and includes a BIOS 13 that supports a configuration wherein floppy drives having a capacity of 720 k to 1.44 MB are assigned drive letters a: and b:. The BIOS 13 also provides for fixed disks which are assigned drive letters c:, d: and so on, and are configured with a cylinder, head and sector number that relates to the capacity of the drive. Further, as most BIOSes 13 in computer systems support booting (i.e., starting the system) from only drives a: and c:, it is preferable that the BIOS 13 supports a configuration wherein the high capacity removable media drive 11a or 11b may be assigned drive letter a: such that the computer system 10 may be booted from the high capacity removable media drive. The high capacity removable media drive 11a or 11b operates to read and/or write to a high capacity storage media contained within a removable storage cartridge 19.

A removable high capacity media controller 27 serves as an interface between the removable media drive 11a and the CPU 12. For example, the high capacity removable disk controller 27 may comprise a Small Computer System Interface (SCSI) or Integrated Drive Electronics (IDE) interface controller. A hard disk and floppy disk controller 25 serves as an interface between the CPU 12 and the hard disk 26 and the CD-ROM/R/RW drive 17, and the floppy disk 28 and tape drive 15, respectively. It will be appreciated by those skilled in the art, the disk controller 25 may comprise separate floppy and hard disk controllers (e.g., IDE or SCSI controller), and that the high capacity removable media drive 11a may also utilize the disk controller 25 as an interface to the CPU 12.

An exemplary high capacity removable media drive is disclosed in U.S. patent application Ser. No. 08/651,321, filed on May 21, 1996, the disclosure of which is incorporated herein by reference in its entirety. In the exemplary embodiment in application Ser. No. 08/651,321, an IDE high capacity removable media drive 11a is described which may comprise several subcomponents, including: a 40 pin IDE bus connection; a CPU, for example, an 8052; a 1 k Data RAM memory for executing local programs; a 32 k ROM memory for storage of programs; a controller circuit, such as an AIC-7166 manufactured by Adaptec, which controls buffer management of data to and from the media, media interface, and processor interface via the IDE bus; a Timing Processor for providing timing signals to the servo motors and the read/write channel; motor control circuitry; an RLL encoder for writing data to the media; and an RLL decoder for reading data from the media. The high capacity removable media drive 11a or 11b is capable of communicating with the removable high capacity media (IDE) controller card 27 via cylinder, head, and sector mode (hereinafter CHS mode) or logical block address mode (hereinafter LBA mode). In CHS mode, the controller card 27 presents a logical cylinder, head and sector from which data on the media is desired. The drive translates this information to a physical cylinder, head and sector to retrieve the data from the media. Importantly, the cylinder head and sector information set into CMOS 13a defines the logical number of cylinders, heads and sectors on the drive and defines the translation used by the drive to determine where to physically retrieve the data on the media. In LBA mode, the controller card 27 communicates with the drive 11a through a linear mapping of sectors, starting at sector 0 and continuing to the last sector depending on the capacity of the drive.

Other controllers are connected to the CPU 12 to provide an interface between a variety of external devices and the CPU 12. For example, a parallel port controller 16, a monitor controller (video card) 18, and a keyboard and mouse controller 20 each provide an interface between CPU 12 and an external high capacity removable media drive 11b (or printer), monitor 22, and keyboard and mouse device 24, respectively. The exemplary computer system 10 of FIG. 1 is configured with two high capacity removable media drives to emphasize that a high capacity removable media drive can be implemented in either internal or external form.

As noted above, the present invention is directed to a document mirroring application that allows users to easily and effortlessly keep an up-to-date backup of their key files to removable media. The application of the present invention is compatible with all high capacity removable media drives, including Iomega® Zip®, Iomega® Jaz®, Iomega® Clik!™, CD-RW drives, etc. The mirroring application will run on PC based systems running Windows® 95 Windows® 98, Windows NT® and Windows® 2000. The application will also run on Apple® Macintosh® running the Mac® OS v.7+. The software is preferable localized and, in particular, includes versions in English, Japanese, French, German, and Spanish languages.

Installation Process

A brief overview of the installation process is as follows: The user is provided an option to install the mirroring application software or viewing tutorials upon launching the installation software. For example, the user may be provided with an explanation and promotion of the mirroring software and an animated tutorial. "Wizards" will walk the user through the installation in a step-by-step fashion. The installation software will automatically detect the desired language, and if operating system language is not supported, prompt the user with choices of supported languages. The installation software will also detect the operating system, set configuration options, and install the correct version of the mirroring software to a selected destination directory.

Referring now to FIGS. 2, 5–10, the process of installing the mirroring application software will now be described in greater detail. As noted above, it is preferable that a setup "wizard" step the user through the process of installing the mirroring application. Wizards are well known by those of ordinary skill in the art. It is noted that the user may click Cancel, Next, Back and Tell me more . . . (i.e., help) buttons at any point during the installation process.

The process begins when the user clicks an installation icon (or .exe file from, e.g., Windows® Explorer) at step 100 and is provided a confirmation screen to begin the installation of the mirroring software. After clicking a "Next" button, a license agreement is displayed (step 102). If the user does not accept the license at step 102, the installation software exits at step 104. Otherwise, the installation continues at step 106 where a splash screen is displayed and files are copied in preparation for the installation (step 108). It is preferable that InstallShield® software is used for the installation process, as is known by those of ordinary skill in the art. The user may also be asked to electronically register the software.

Figure 5:
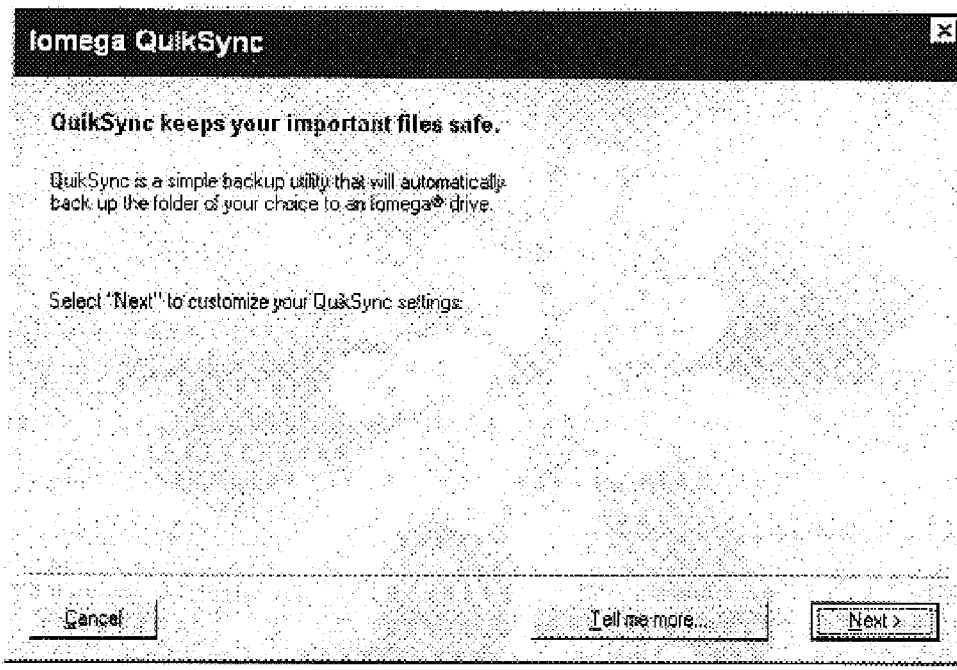
FIGS. 5–10 are exemplary screen shots of the displays provided during the installation process.

At step 110, the user is provided with an informational display, such as the exemplary display of FIG. 5. Again, the user may click the "Tell me more . . . " button to obtain help (step 112). If at step 110 the installation software is unable to determined a language to use, the user will be prompted for a language.

Figure 6:
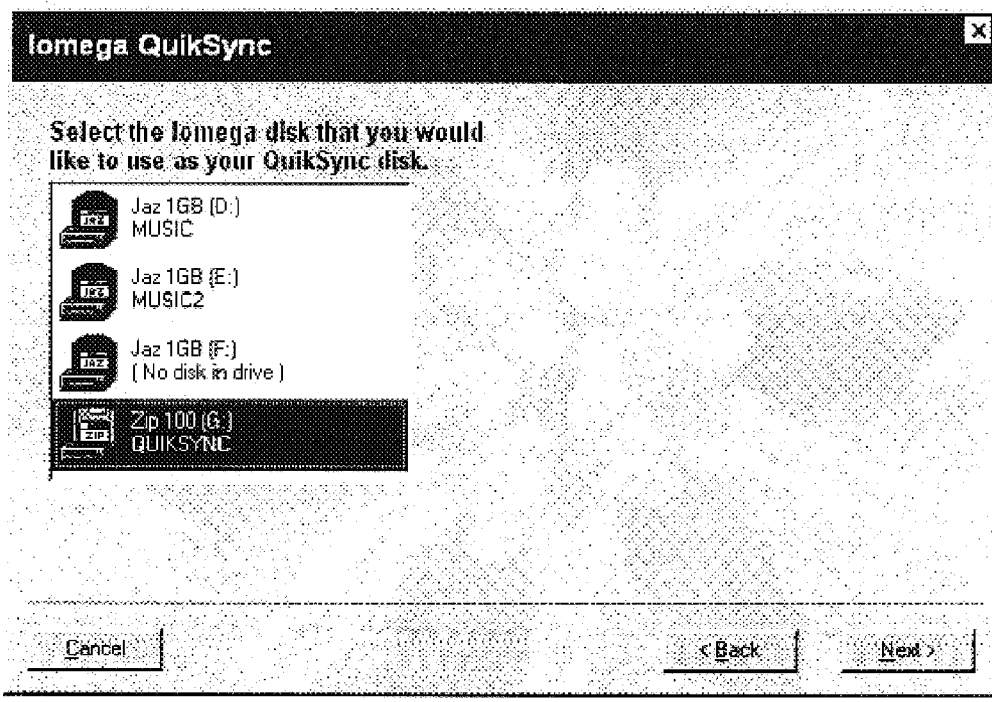
Figure 7:
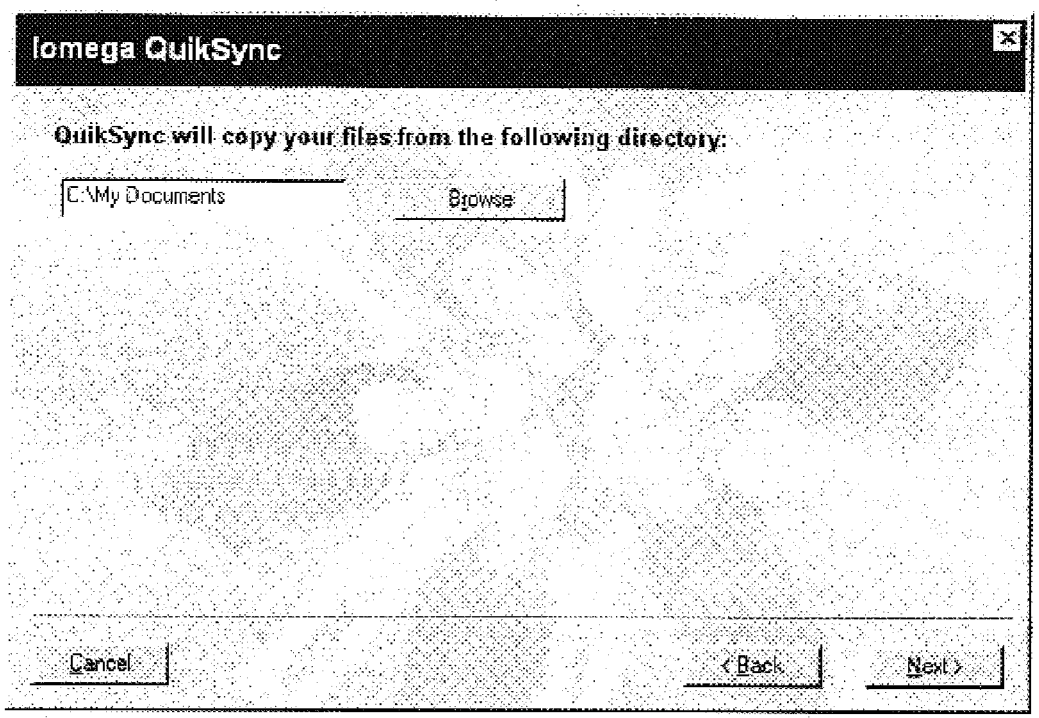
Figure 8:
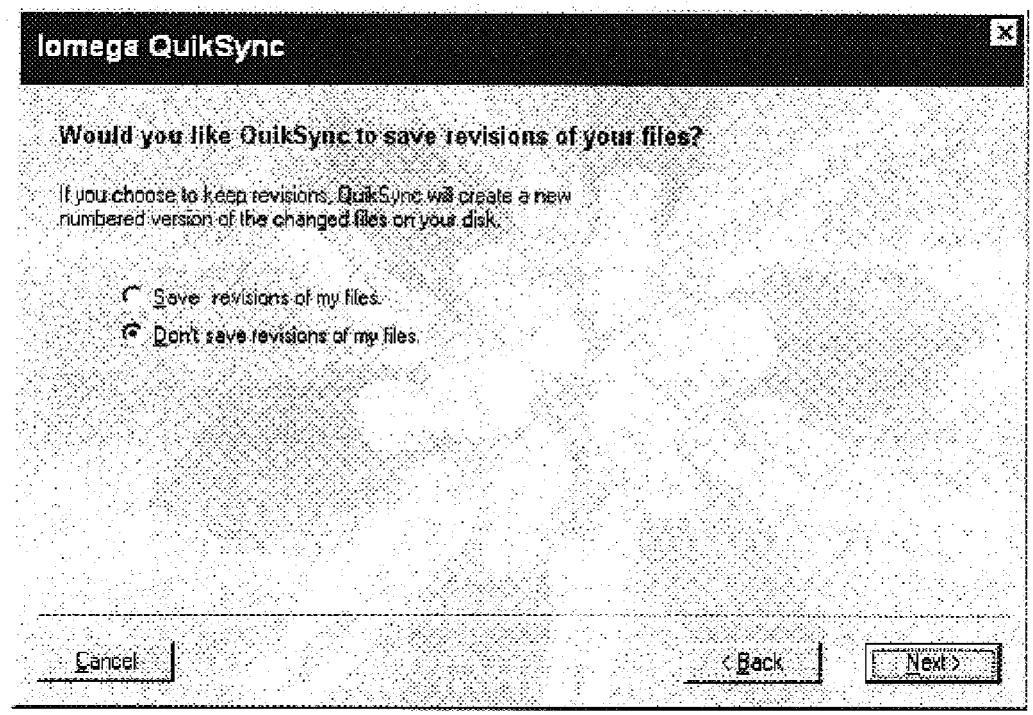
Figure 9:
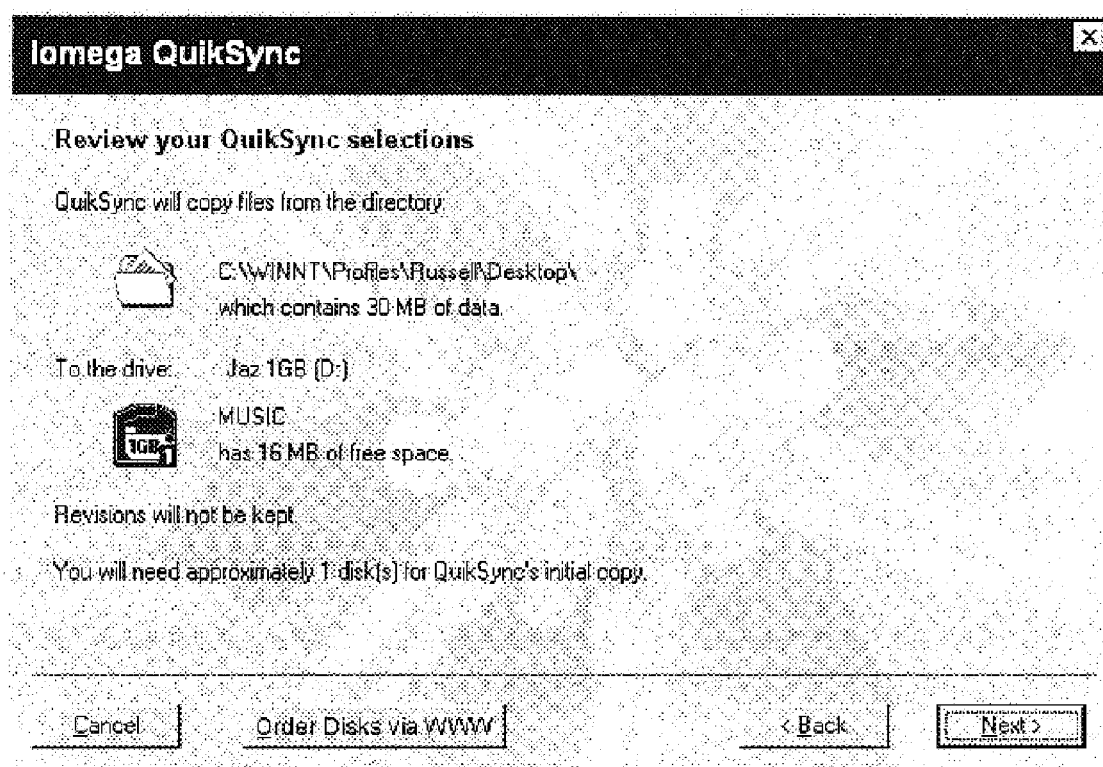

At step 114, a display such as the exemplary display of FIG. 6 is provided to the user. The user then indicates the particular removable media (and associated media drive) that is to be used as the backup media (mirror disk). It is preferable that intelligent defaults are provided to user (e.g., Zip 100 (G:)). The user is instructed to label the disk selected in FIG. 6 as the "mirror disk."

At step 116, the user's computer system 10 is then scanned for other drives (e.g., hard disk drives 26 or other removable media drives 11a). The user is then asked to select a source folder (directory) to be mirrored on the mirror disk at step 120. If there are more than one hard disk or logical partition configured in the user's computer system 10, the user is first prompted to selected a drive at step 118, and then prompted for the source folder at step 120.

At step 122, in accordance with the amount of data stored within the folder selected at step 120, the user is provided with a message that the source folder will occupy more than 75% of the mirror disk and reminded that additional disks are available for purchase on a predetermined Web site (step 124), that the source folder will not fit on the mirror disk (step 126), or no message (step 128).

Figure 3:
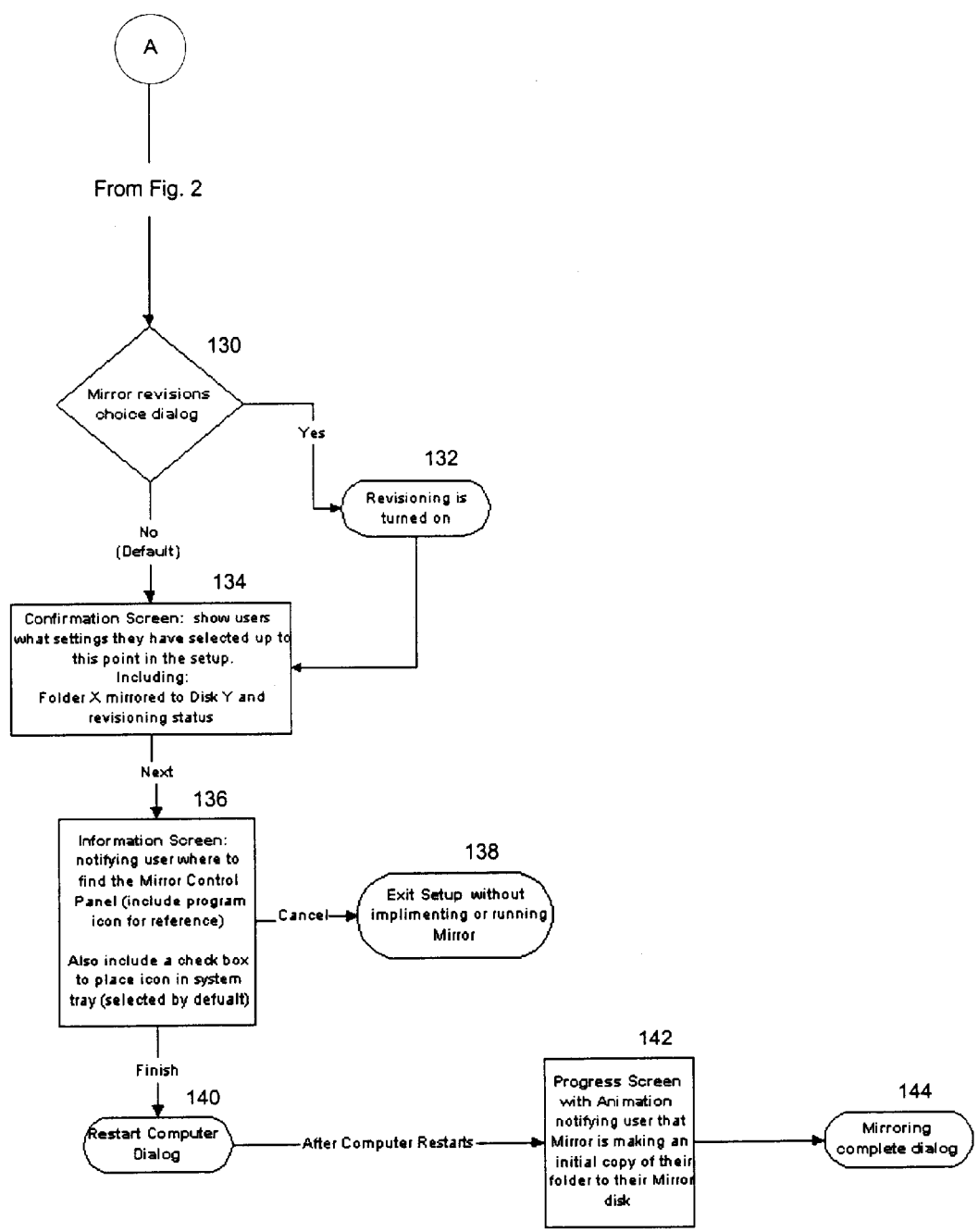

Next (at step 130 in FIG. 3), the user is prompted to determine if revisions of files are to be mirrored. A screen such as the exemplary screen of FIG. 8 may be provided for the user to input a response. In particular, the mirroring software may make backup copies based on a predetermined period of time elapsing and/or if a file has been revised and saved. If revisions are to be mirrored, revisioning is turned on at step 132, otherwise processing continues at step 134 where a confirmation screen is presented to the user, such as the exemplary screen illustrated in FIG. 9. The confirmation screen presents all of the user's selections on one screen prior to initiating the actual installation process.

In accordance with the present invention, the mirror disk is identified by a unique identifier contained on the media. The computer system 10 may query the particular piece of media 19 for the media's unique identifier during the installation process. By way of a non-limiting example, the media 19 may comprise a ZIP® disk manufactured by Iomega Corporation, Roy, Utah. Each Iomega® ZIP® disk contains a unique serial number that is written to a predetermined track during the formatting process which may be used as the unique identifier. Further, while the media 19 has been described in terms of a ZIP® disk, it is not limited to the ZIP® disk, as the use of other removable and permanent media types having a unique identifier is within the scope and spirit of the present invention such as CD-RW, DVD-RAM, and other removable floppy and hard disks.

The system 10 may query the media using an application programming interface (API) such as the Iomega Ready™ API, or other suitable method. The Iomega Ready™ API when invoked causes the media drive to read the unique serial number from the predetermined track by using the SCSI 0x06 Non-Sense Command. In particular, by invoking the Disk Status Page (page 0x02) of the Non-Sense Command, the media serial number may be determined by reading offset bytes 20–59 of the returned data structure. Exemplary source code for obtaining the unique identifier in conjunction with an Iomega® ZIP® drive and disk is as follows:

```
void CClientApp::GetZipDrive( )
{
    int j,k;
    m_DriveNum = 0;
    for(j = 0;j < 26;j++)
        // scan the drives and find the IOMEGA drives
    {
        if(IsIomegaDrive(j) )
        {
            k = GetGeneralDevType(j);
            if( k == DRIVE_IS_ZIP )
            {
                m_DriveNum = j;
                j = 26;
            }
        }
    }
}
void CClientApp::GetSerialNumber( )
{
    unsigned char szBuffer[1024];
    memset(szBuffer,0,sizeof(szBuffer));
    memset(&m_SerialNumber,0,40);
    GetInfoNonSense(m_DriveNum,0x02,szBuffer);
    memcpy(&m_SerialNumber,&szBuffer[22],39);
}
```

It can be appreciated that the unique identifier is not limited to information stored on the media 19 such as the serial number, and that other types of information could be used as the unique identifier. In addition, the unique identifier should contain a sufficient number of bits (length) to ensure that no two pieces of media have the same identifier. For example, each Iomega® ZIP® disk contains a unique 39 byte (312 bits) serial number, and other bit lengths may be utilized.

Figure 10:
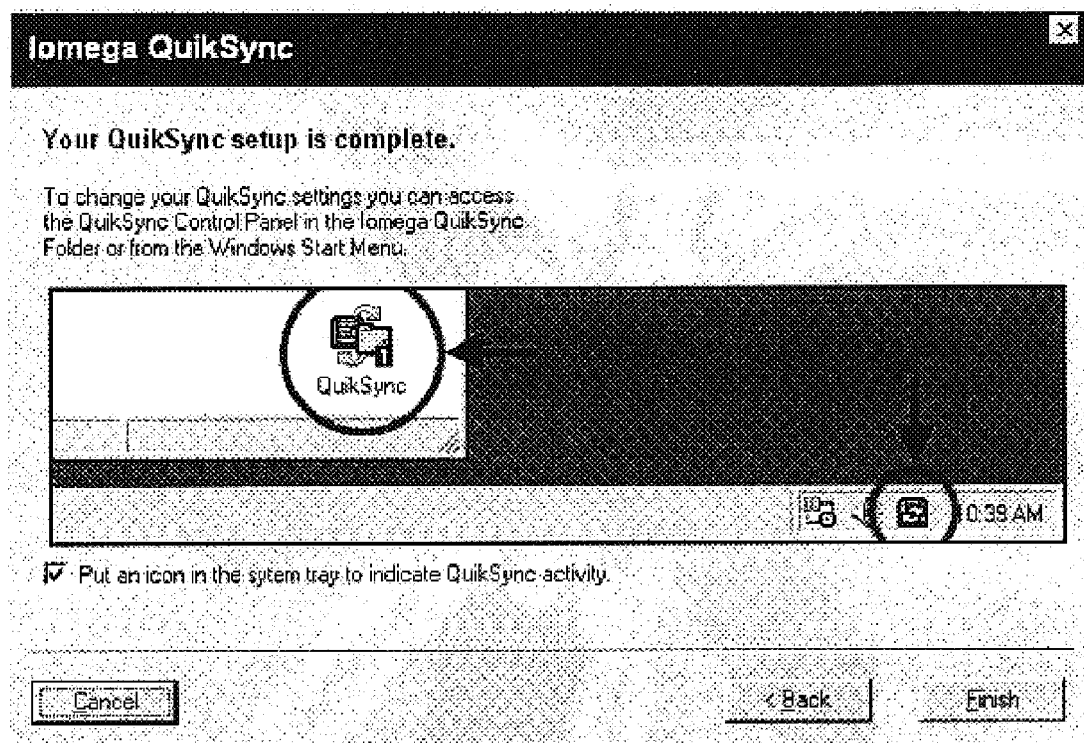

At step 136 an information screen such as the exemplary screen illustrated in FIG. 10 is presented to notify the user where the mirror application control icon may be found. The user is provided with an opportunity to cancel the installation at step 138. If the user continues with the installation, the user is prompted to restart the computer to complete the installation after the mirror application components are copies to the destination directory.

After the computer restarts, the source folder selected at step 118 is initially copied to the mirror disk and the installation is completed.

Monitoring Operation

The present invention is simple to use and requires no user intervention unless the mirror disk is needed or full. The mirror application loads when the computer system 10 is booted or when a particular user logs onto the system 10. The application monitors the source directory in accordance with the user selected options. An animated icon will show the current status of the mirror application and indicate: a data copy operation, no mirror disk, monitoring the source directory, and if the application is disabled. For Windows® based PCs, the animated icon will be in the system tray. For Macintosh® computers, the animated icon will be in the menu bar.

Figure 4:
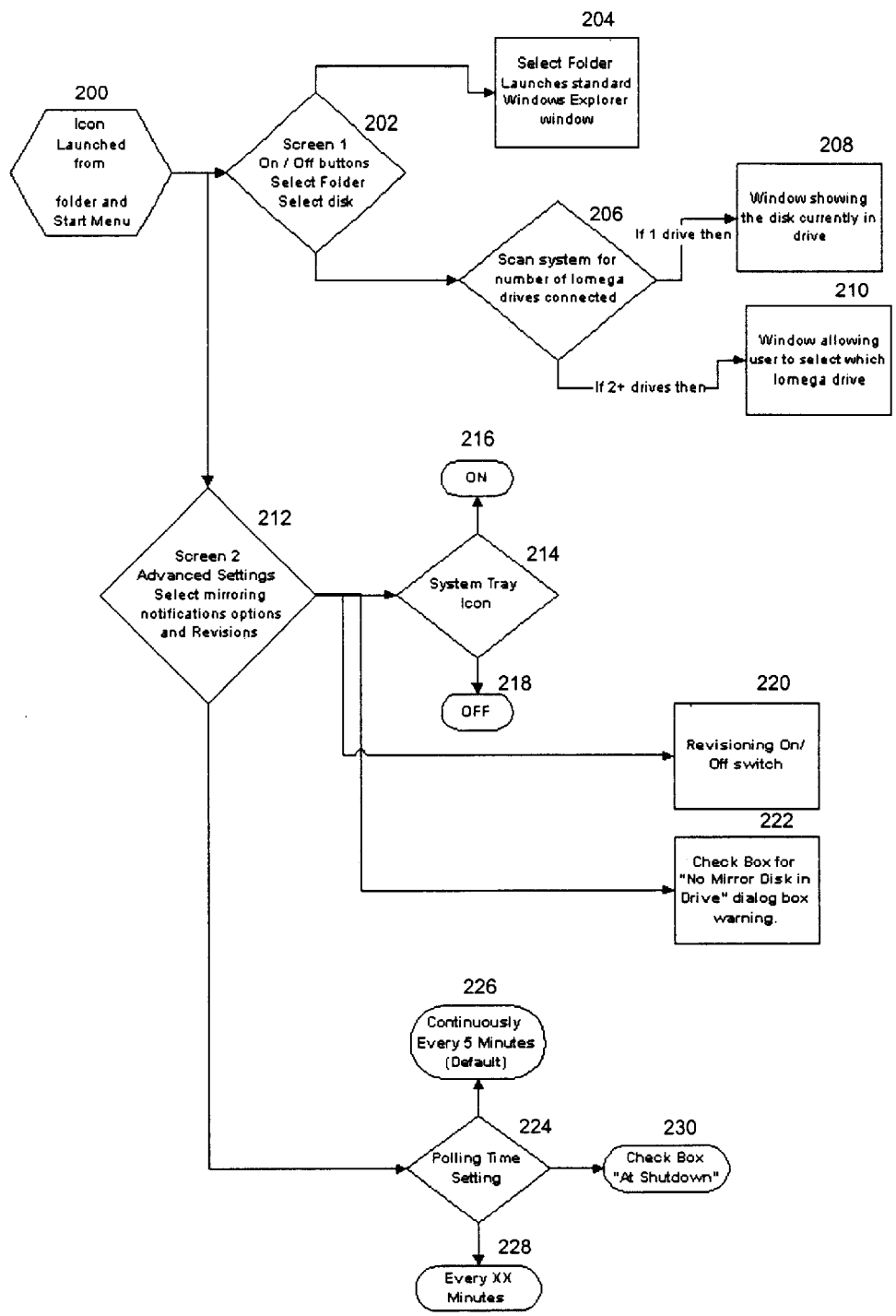
FIG. 4 is a flow charts illustrating the processes performed by a monitoring application of the present invention.
Figure 11:
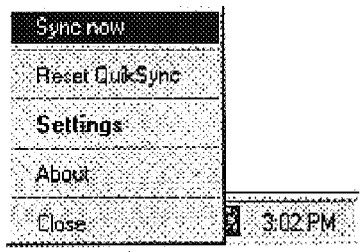
FIGS. 11–13 are exemplary screen shots of the displays provided during the monitoring process.

FIG. 4 illustrates the processes performed by the mirror application during the monitoring operation. When a change occurs to the data in the selected directory, the mirror application will copy the changed data to the mirror disk after the predetermined delay time between synchronizations has passed and/or a revision is saved. At any time the user may reconfigure the mirror application operation by launching the application icon from, e.g., the Start Menu or System Tray (step 200). By clicking on the System Tray icon a menu is displayed to the user, such as that in FIG. 11. The user may force a synchronization of the selected directory to the mirror disk ("Sync now"), reset the mirror application, change the settings, obtain information on the mirror application, or close the mirror application.

Figure 12:
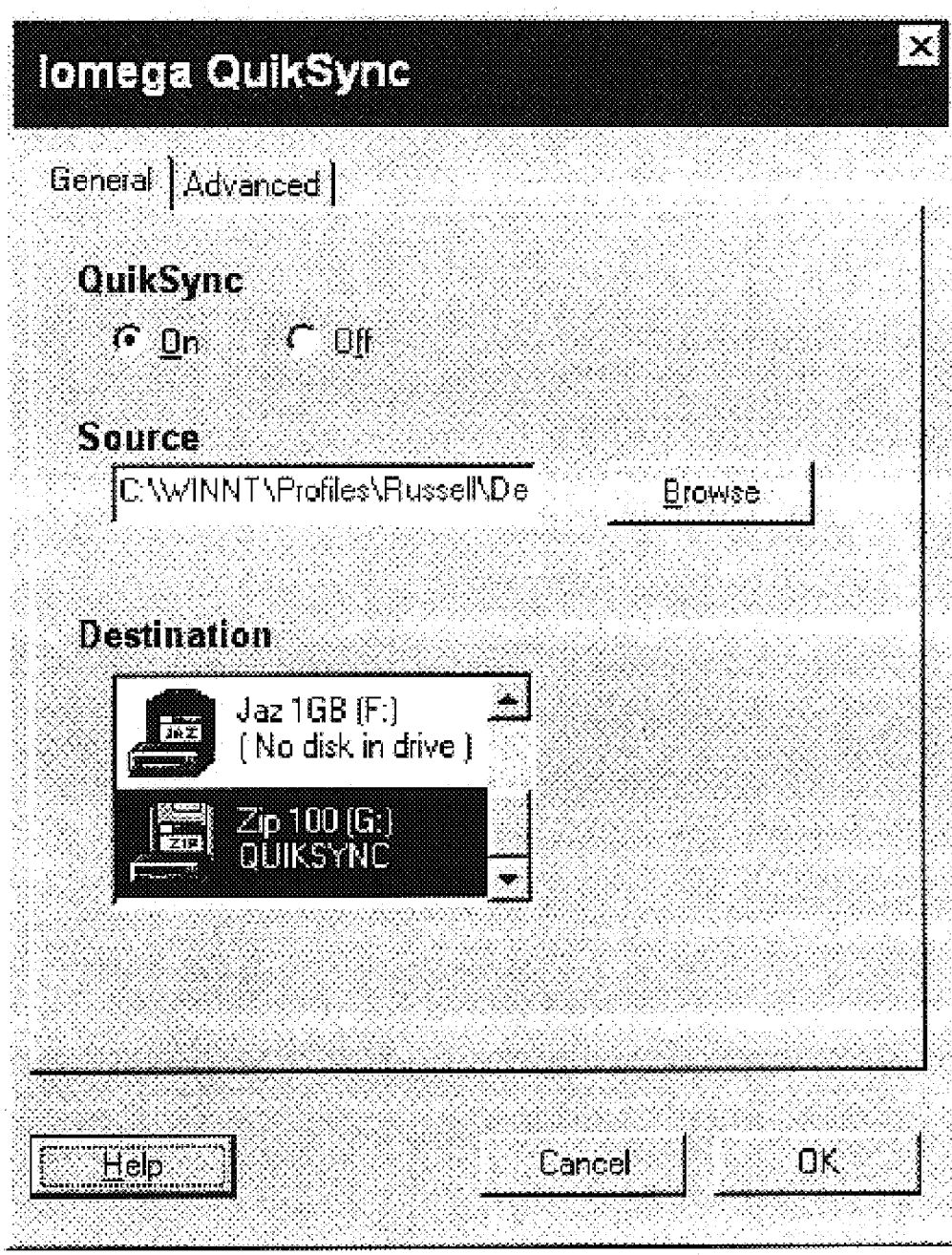

If the user chooses "Settings," then the general settings tab will be displayed at step 202. An exemplary general settings display is illustrated in FIG. 12. The mirror application can be turned off/on at step 202 (QuikSync on and off radio buttons). The source directory may also be changed (step 204) by entering the path or using a Windows® Explorer window to select the source directory. In addition, the user may also change the destination mirror disk (step 206) by selecting a new destination drive (steps 208 and 210).

Figure 13:
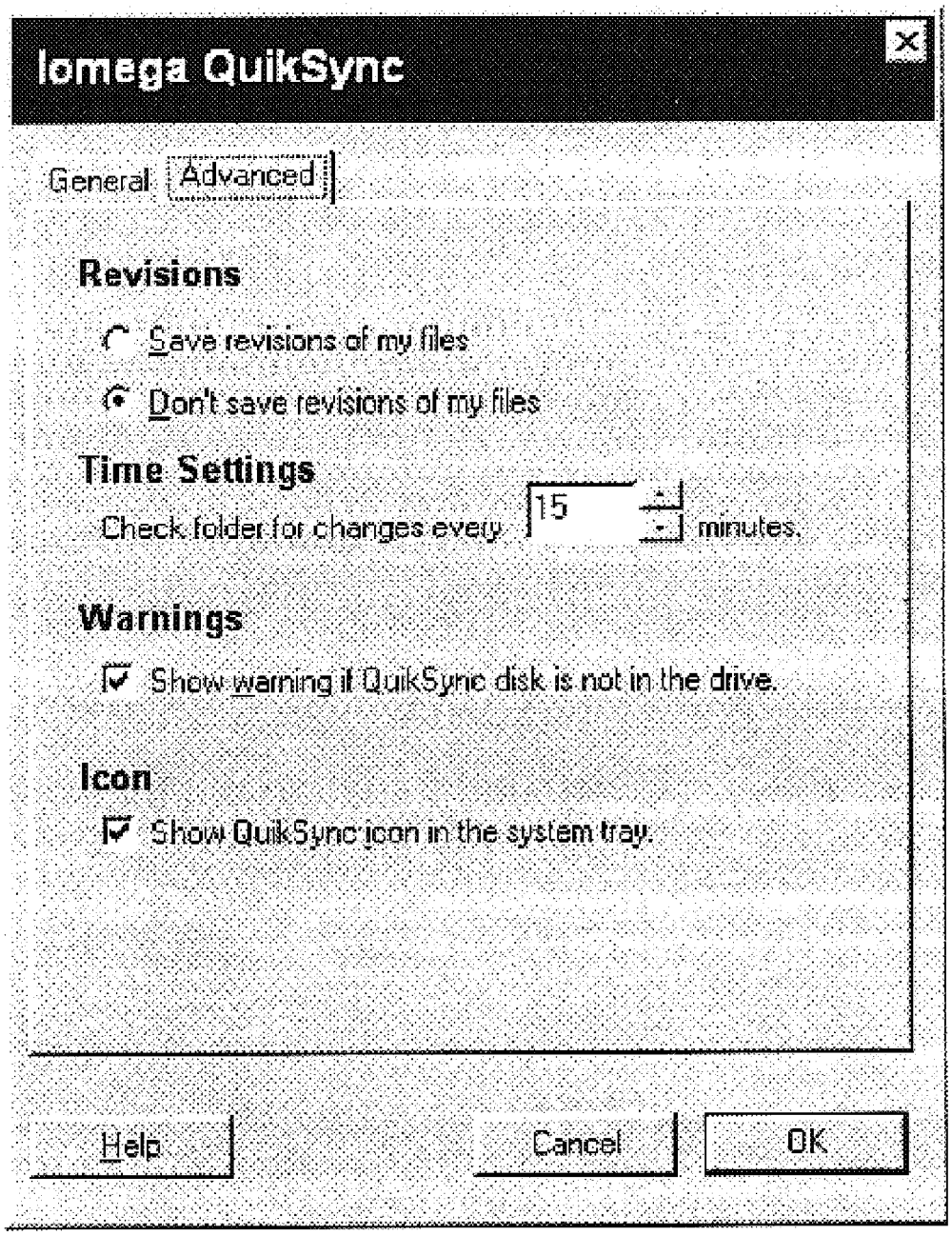

If the user wishes to change the advanced settings at step 212, the exemplary display of FIG. 13 is presented. The user can turn off/on the System Tray icon by unchecking/checking the Icon option (steps 214–218); set revisioning off/on by clicking the appropriate radio button(step 220); turn off/on warnings by unchecking/checking the Warnings option (step 222), or change the predetermined time between synchronization operations to save the source folder to the mirror disk by enter a number of minutes between folder checks (steps 224–230).

An advantage of the present invention over conventional backup utilities is that a separate restore operation is not necessary to restore the most recent version of a file. In accordance with the present invention, filenames on the mirror disk have a revision number placed after the filename and before the extension. Thus, a source file in the source folder having the name "myfile.doc" will be stored on the mirror disk having the name "myfile(1).doc" for a first revision, and so on. The mirror application advantageously keeps an infinite number of revisions. Thus, to restore a file (e.g., "myfile.doc"), the user simply inserts the mirror disk into the removable media drive and selects the highest numerical revision of the file (e.g., "myfile(87).doc"). The file can be simply copied back to the source folder or other folder and/or drive for immediate use.

The mirror application is adapted to prompt the user if certain error conditions arise during its operation. For example, if a single file to be mirrored is larger than the total capacity of the destination media, the user will be shown a dialog indicating that source file, e.g., "myfile.doc" is larger than the total capacity of the media and must be skipped. If the current mirror disk is full, the mirror application will prompt the user to make another mirror disk or work offline (e.g., in a temporary directory on the hard drive if space allows). Also, if the mirror disk is not in the drive, the user will be given the choice to create a new mirror disk, insert an existing mirror disk, or work offline.

The following are the classes exposed by the present invention to implement the mirroring operation. A Control object acts as a flow controller for the application. All communication between modules are preferably routed through Control. The control module will start the file monitor and the poll routine. It will also start the engine when needed.

Public Members:

Run ( )—creates a thread that launches the file monitor thread, waits for events from the file monitor, polls at a user specified interval, runs engine when changes are detected, passes errors that occur to the error manager, starts and stops the system tray icon animation when copying files OnSettingsChange( )—calls Abort( ) and then calls Run( ) so the user changes will be detected Abort( )—stops the wait for event loops and kills the thread OnShutdown( )—calls Abort( ) to stop the event loop and then calls the Poll module to backup any files that might have changed since the last backup, this will be called at system shutdown only Private/Protected Members:

StartFileMon( )—launches the File Monitor thread

SaveDiskID( )—saves the serial number of the disk to the registry, this will be used to track the current Mirror disk GetDiskID( )—retrieves the serial number of the current Mirror disk from the registry, this will be used to ensure the current Mirror disk is present SaveLastBackupTime( )—saves the time that Mirror was last run to the registry GetLastBackupTime( )—retrieves the time from the registry that Mirror was last run StartPoll( )—launches the Poll module to see what files have changed since the last backup StartEngine( )—launches the Engine module and makes a call to animate the system tray icon StartAnimateIcon( )—starts the system tray icon animation StopAnimateIcon( )—stops the system tray icon animation OnCreate( )—creates the event loop thread and places an icon on the system tray LockDrive( )—makes the disk in the specified drive non-removable UnLockDrive( )—makes the disk in the specified drive removable IsCurrentMirrorMedia( )—checks to see if the current disk in the drive is the current Mirror disk CreateMirrorMedia( )—prepares the current disk in the drive for use by Mirror.

Thus, the present invention provides users with an easy to use archive utility such that recovery from disasters may be quickly accomplished. Because the present invention operates with any high capacity removable media, it is highly likely that the backup data will be easily transportable to a backup computer for immediate use.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. An archiving system for archiving data files to storage media producing readily readable and removable archives, the system comprising:
   a processor system including a processor;
   at least one source storage device accessible by said processor system to read data files from source media;
   at least one destination device accessible by said processor system to write data files to attached high capacity removable media having a file system on the high capacity removable archive media;
   at least one program storage device accessible by said processor system, said program storage devices not necessarily being distinct from said source storage devices or said destination devices, said program storage devices further containing configuration, said configuration specifying a set of files to be archived and a synchronization period, said program storage devices further containing computer instructions executable by said processor system to achieve the functions of:
   (i) reading said configuration stored on said program storage devices,
   (ii) periodically initiating a synchronization operation, utilizing the synchronization period specified in said configuration,
   (iii) testing for the presence of a high capacity removable media attached to a destination device;
   (iv) during the synchronization operation, monitoring for modification the set of files specified by said configuration, the monitoring producing a set of modified file references,
   and (v) following performing the monitoring function and during the synchronization operation, writing a copy of each corresponding file in the set of modified file references to the file system on the high capacity removable media, the writing occurring only if the testing indicates the presence of a high capacity removable media attached to a destination device.

2. The archiving system of claim 1, wherein:
   said configuration further specifies the locations of one or more directories containing files to be archived;
   and the monitoring function provided by said computer instructions executable by said processor system monitors for modification of files contained in the directories specified by said configuration, the monitoring producing a set of modified file references.

3. The archiving system of claim 1, wherein:
   said configuration further specifies a destination device;
   said testing tests for the presence of a high capacity removable media in the configuration specified destination device;
   and the writing function provided by said computer instructions executable by said processor system writes a copy of each corresponding file in the set of modified file references to the file system on the high capacity removable media attached to the destination device specified by said configuration.

4. The archiving system of claim 1, wherein:
   said configuration further contains at least one location to store a media identifier;
   said computer instructions are further executable by said processor system to achieve the functions of:
   (vi) identifying a high capacity removable media by reading a unique identifier previously written to the media attached to a storage device accessible by said processor system,
   (vii) storing the unique identifier read following the performance of the identifying function to the media identifier location contained in said configuration,
   (viii) during the synchronization operation and following a positive indication in performing the testing function, reading a unique identifier on the high capacity removable media attached to a destination device;
   and (ix) during the synchronization operation and following the performing of reading a unique identifier function, comparing the unique identifier read from the attached high capacity removable media against the media identifiers stored in said configuration;
   and the writing function provided by said computer instructions executable by said processor system writes a copy of each corresponding file in the set of modified file references to the file system on the high capacity removable media attached to a destination device only on a positive match in performing the comparing function.

5. The archiving system of claim 4, wherein the archiving system further comprises (1) a display controllable by said processor system and (2) at least one input device whereby a user may provide input to said processor system; and wherein:
   said computer instructions are further executable by said processor system to achieve the functions of:
   (x) after determining a negative indication of a match in performance of the comparing function, displaying a query asking a user if it is desired to use the high capacity removable media attached to a destination device for archival,
   (xi) receiving a response from a user through said input devices;
   and the functions of identifying a high capacity removable media and writing a copy of each corresponding file in the set of modified file references may be performed following receipt of a positive response from a user through performing the function of receiving a response.

6. The archiving system of claim 1, wherein the writing function provided by said computer instructions executable by said processor system writes a copy of each corresponding file in the set of modified file references to the file system on a high capacity removable media attached to a destination device, each copy having a filename containing a revision identifier appended to the filename of the corresponding modified file.

7. The archiving system of claim 1, wherein the archiving system further comprises a display controllable by said processor system; and wherein the computer instructions are further executable by said processor system to achieve the functions of:

(vi) identifying the amount of free data space and the amount of total usable data space on a high capacity removable media attached to a destination device, (vii) comparing the amount of free space identified through the identifying the amount of free data space and total usable data space function against a percentage threshold;

(viii) displaying a message to a user through said display indicating that new high capacity removable media will be needed in the future, the displaying function performing only if the result of the comparing the amount of free space function indicates the amount of free space available on the high capacity removable media compared to the total usable data space on the media is less than the percentage threshold.

8. The archiving system of claim 7, wherein the computer instructions are further executable by said processor system to achieve the function of displaying on said display a message that additional high capacity removable media may be purchased from at least one particular source.

9. The archiving system of claim 1, wherein the archiving system further comprises (1) a display controllable by said processor system and (2) at least one input device whereby a user may provide input to said processor system; and wherein:

said computer instructions are further executable by said processor system to achieve the functions of:
(vi) providing a selectable feature on said display,
(vii) accepting an action to the feature from a user through said input devices,
(viii) upon accepting an action from a user, initiating a synchronization operation.

10. A set of computer readable media containing computer executable instructions for archiving data files to a storage medium producing a readily readable and removable archive, the set of computer readable media comprising at least one medium upon which is stored computer instructions executable by a computing system to achieve the functions of:

(i) reading configuration stored on at least one program storage device media accessible by the computing system, (ii) periodically initiating a synchronization operation using a synchronization period specified in the configuration, (iii) testing for the presence of a high capacity removable media attached to a destination device accessible by the computing system;

(iv) determining a set of files to be monitored by interpreting the configuration, the configuration containing information specifying a set of files to be monitored, said determining producing a set of file references to files on source storage devices accessible to the computing system;

(v) during the synchronization operation, monitoring for modification the set of files determined through the function of determining a set of files, the monitoring producing a set of modified file references, and (vi) following the monitoring and during the synchronization operation, writing a copy of each corresponding file in the set of modified file references to a file system on the high capacity removable media attached to the destination device accessible by the computing system, the writing occurring only if the testing indicates the presence of a high capacity removable media attached to the destination device.

11. The computer readable media set of claim 10, wherein:

the determining function provided by said computer instructions executable by the computing system interprets configuration containing a set of references to directory to be monitored;

the monitoring function provided by said computer instructions executable by the computing system monitors for modification of files contained in the directories determined by said determining.

12. The computer readable media set of claim 10, wherein the writing function provided by said computer instructions executable by the computing system writes a copy of each corresponding file in the set of modified file references to the file system on the high capacity removable media attached to a particular destination device specified by the configuration.

13. The computer readable media set of claim 10, wherein said computer instructions are further executable by the computing system to achieve the functions of:

(vii) identifying a high capacity removable media attached to a storage device accessible by the computing system by reading a unique identifier previously written to the media, (viii) storing the unique identifier read during the performance of the identifying function to a media identifier location in the configuration, (ix) during the synchronization operation and following a positive indication in performing the testing function, reading a unique identifier on the high capacity removable media attached to the destination device;

and (x) during the synchronization operation and following the performing of reading a unique identifier function, comparing the unique identifier read from the attached high capacity removable media against the media identifiers stored in the configuration;

and the writing function provided by said computer instructions executable by said processor system writes a copy of each corresponding file in the set of modified file references to the file system on the high capacity removable media attached to a destination device if a positive match results in performing the comparing function.

14. The computer readable media set of claim 13, wherein said computer instructions are further executable by the computing system to achieve the functions of:

(xi) after determining a negative indication of a match in performance of the comparing function, displaying a query asking a user if it is desired to use a high capacity removable media attached to a destination device for archival, (xii) receiving a response from a user through an input device;

and the functions of identifying a high capacity removable media and writing a copy of each corresponding file in the set of modified file references may be performed following receipt of a positive response from a user through performing the function of receiving a response.

15. The computer readable media set of claim 10, wherein the writing function provided by said computer instructions executable by the computing system writes a copy of each corresponding file in the set of modified file references to the file system on a high capacity removable media attached to a destination device, each copy having a filename containing a revision identifier appended to the filename of the corresponding modified file.

16. The computer readable media set of claim 10, wherein the computer instructions are further executable by the computing system to achieve the functions of:

(vii) identifying the amount of free data space and the amount of total data space on a high capacity removable media attached to a destination storage device, (viii) comparing the amount of free space identified through the identifying the amount of free data space and total data space function against a percentage threshold;

(ix) displaying a message to a user indicating that new high capacity removable media will be needed in the future, the displaying function performing only if the result of the comparing the amount of free space function indicates the amount of free space available on the high capacity removable media as compared to the total usable space on the media is less than the percentage threshold.

17. The computer readable media set of claim 16, wherein the computer instruction are further executable by the computing system to achieve the function of displaying a message that additional high capacity removable media may be purchased from at least one particular source.

18. The computer readable media set of claim 10, wherein said computer instructions are further executable by the computing system to achieve the functions of:

(vii) providing a selectable feature on a display connected to and controllable by the executing computing system, (viii) accepting an action from a user through input devices connected to the executing computing system, (ix) upon accepting an action from a user, initiating a synchronization operation.

* * * * *